May 23, 1967     E. P. BULLARD III     3,320,831

RETRACTABLE TOOL SUPPORT

Filed June 6, 1966     2 Sheets-Sheet 1

INVENTOR.
EDWARD P. BULLARD III
BY *John H. Midney*
ATTORNEY.

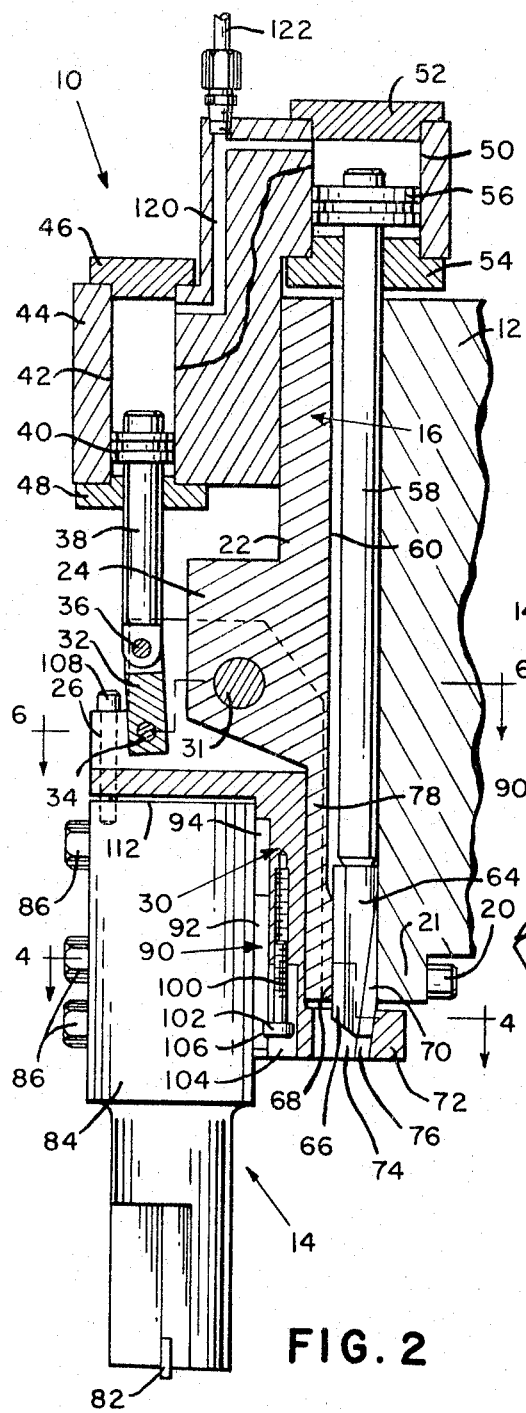
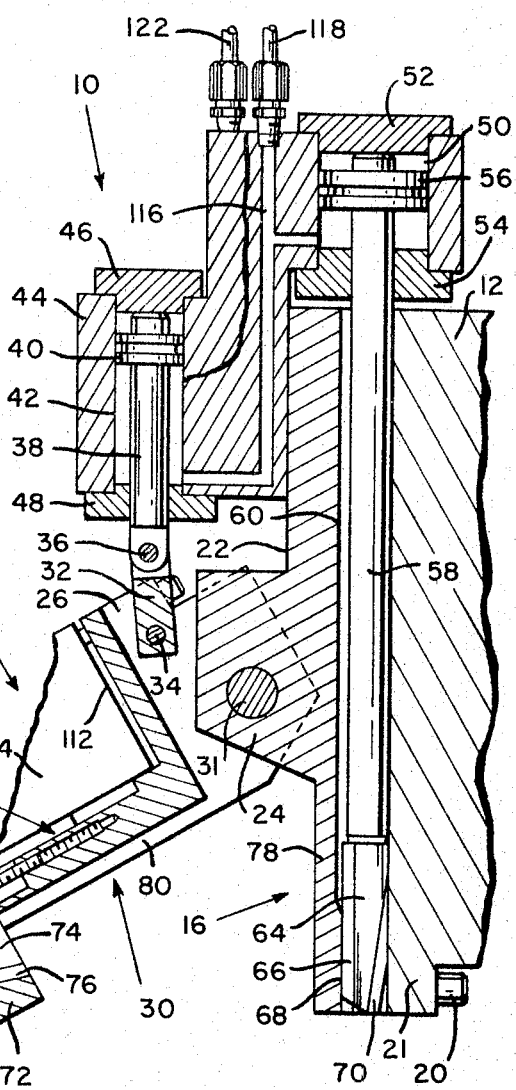
FIG. 2
FIG. 3

United States Patent Office 3,320,831
Patented May 23, 1967

3,320,831
RETRACTABLE TOOL SUPPORT
Edward P. Bullard III, Fairfield, Conn., assignor to The Bullard Company, Bridgeport, Conn., a corporation of Connecticut
Filed June 6, 1966, Ser. No. 555,515
14 Claims. (Cl. 77—1)

The present invention relates to a support for mounting a cutter element on a machine tool cross slide, and has particular reference to an improved retractable tool support which is hydraulically actuated from a normally retracted to an operative position and then locked in the operative position in a predetermined fixed sequence.

Automatic machine tools designed for high rates of production generally utilize multiple tooling actuated by automatic programmed controls to perform a series of operations in succession on a workpiece. Generally, the multiple tooling is mounted on a cross slide of a machine which is moved in a predetermined path to carry the tools along the path and cause the various tools to perform the desired machining operations on the workpiece in a predetermined order.

Oftentimes the multiple tooling may include a tool such as a relatively lengthy boring bar which, in its operative position for performing a particular operation, would interfere with the workpiece as the cross slide is moved to position the other tools for performing their particular operations. It is considered desirable, therefore, to maintain tooling such as a boring bar in a retracted clearance position away from the tool slide when not in use.

When such retractably supported tooling is moved to the operative position, however, it is necessary to firmly hold and lock the tool support to maintain it in a fixed position relative to the cross slide during the machining operation. Moreover, due to the high speeds of operation of the automatic machine tools on which such tooling is used, the movement of the tool support from the retracted to the operative position and the locking of the tool support upon arriving at the operative position must be very quickly and reliably performed in the proper sequence and in a manner which eliminates the possibility of improper sequential operation.

Accordingly, it is a principal object of the present invention to provide a tool support mountable on a machine tool cross slide which normally maintains a cutting tool supported thereon in a retracted position until its use is required.

Another object is to provide such a tool support which is maintained in a rigid, fixed, operative position relative to the cross slide while functioning so as to produce accurate machining operations.

A further object is to provide such a tool support in which a single motivating medium causes the support to move to the operative position and then to be locked therein in a fixed sequence.

Another object is to provide such a tool support which is moved to the operative position and then locked therein in a minimum of time.

Another object is to provide such a tool support in which the rate of movement from the retracted to the operative position can be adjustably controlled without affecting the fixed sequence of movement of the support to the operative position before locking therein.

A further object is to provide such a tool support which rapidly and automatically moves to the retracted position as soon as it is unlocked from the operative position.

Yet a further object is to provide such a tool support wherein the fixed sequence of movement of the tool support to the operative position and subsequently locking the tool support therein is rendered effective by the flow of a pressurized hydraulic fluid from a single source.

Still a further object is to provide such a tool support wherein a cutting tool mounted therein can be adjustably positioned relative to the support.

The above objects may be accomplished in the present invention by providing a base pivotally mounting a tool support for limited movement between an operative position in which it is adjacent to the base and a retracted position in which it is swung outwardly away from the base. A first piston and cylinder is operatively connected at the rod end to the pivotally mounted tool support, and a second piston and cylinder is operatively connected at the rod end to a movable finger which is engageable with a latch integral with the tool support when the tool support is in the operative position. A source of hydraulic fluid maintained at a constant pressure is connected at all times with the rod ends of both cylinders. The head ends of both cylinders are connected to a single line leading to a control valve. In its normal position, the control valve connects the head ends of both cylinders to an exhaust reservoir at atmospheric pressure, so that the unbalanced forces due to the constant pressure fluid exerted on the rod ends of the pistons normally maintain the tool support in a retracted position and the finger in an unlock position. When it is desired to move the tool support to the operative position, the valve is moved to a position which permits a pressurized hydraulic fluid to flow simultaneously into the head ends of both cylinders. The ratio of the effective area of the head end of the first piston to the effective area of the rod end of the first piston is much greater than the corresponding ratio between the effective areas of the head to the rod end of the second piston. Consequently, as the pressure increases simultaneously in the head ends of the first and second cylinders due to the flow of the pressurized fluid therein, it reaches a point at which the forces on the two sides of the first piston are in balance while the force on the rod end of the second piston is still much greater than the force on the head end thereof. A slight further increase in the pressure in the head ends of the cylinders thus causes the first piston to move the tool support to the operative position while the locking finger remains in the unlock position. During this movement of the first piston, the increasing volume prevents further pressure buildup in the head ends of the cylinders above the pressure required to keep the first piston moving. It will be appreciated that this action takes place at a rate dependent on the rate of flow of the pressurized fluid into the head ends of the cylinders which may be controlled by the position of the control valve, but will nevertheless proceed in this manner irrespective of the rate of flow of the fluid permitted by the control valve position. After the first piston has moved its full stroke to thereby move the tool support fully to the operative position, the pressure in the head ends of the cylinders again begins to increase to a point in which the forces on the two sides of the second piston are balanced, and a further pressure increase now causes the second piston to move the finger to the lock position, whereby it engages the latch and locks the tool support in the operative position. Movement of the tool support back to the retracted position is accomplished by simply moving the control valve to its normal position wherein the head ends of both cylinders are again connected to the exhaust reservoir, whereupon the second piston will automatically move the finger to the unlock position because of the force exerted on the rod end thereof by the constant pressure fluid. The first piston will, in turn, automatically move the unlocked tool support to the retracted position under the action of the constant pressure fluid on the rod end thereof.

Numerous other objects and advantages of the invention will be apparent as it is better understood from the following description which, taken in connection with the accompanying drawings, discloses a preferred embodiment thereof.

Referring to the drawings:

FIG. 2 is a reduced sectional view of the apparatus of FIG. 1 taken substantially along the vertical centerline, with an upper portion offset from the vertical centerline so as to pass through one set of fluid conduits;

FIG. 3 is a view similar to FIG. 2, with an upper portion offset from the vertical centerline in another direction so as to pass through another set of fluid conduits, and showing the tool holder in the retracted position;

Figure 1:
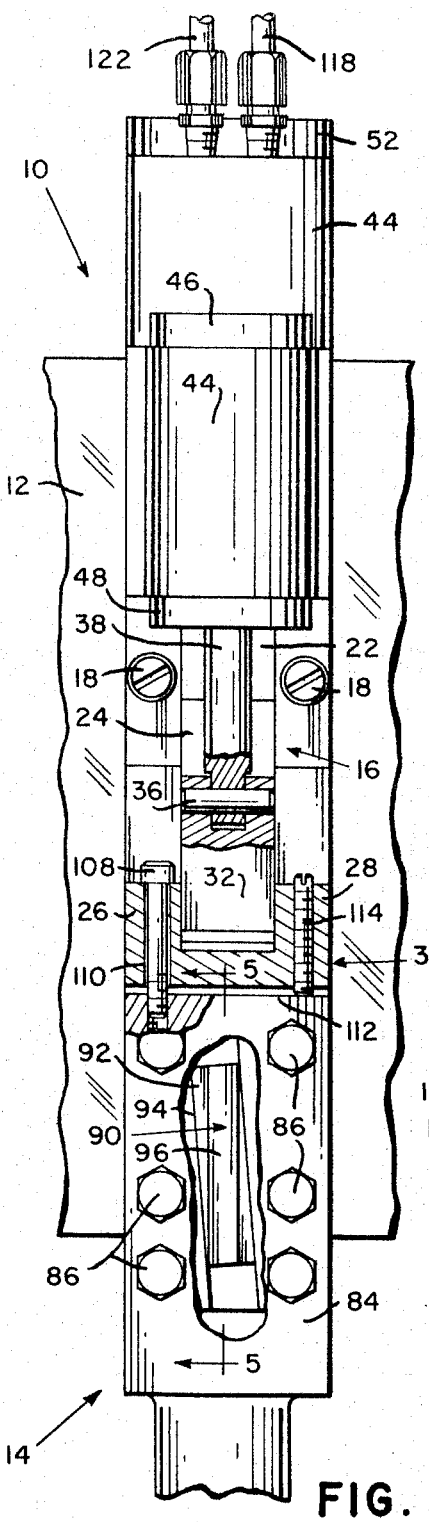
FIG. 1 is an elevational view, with portions broken away, of a retractable tool supporting apparatus embodying features of the present invention and showing the tool holder in the operative position.

As a preferred or exemplary embodiment of the instant invention, FIGS. 1, 2 and 3 show a retractable tool support generally designated 10 mounted on a slide 12 of a machine tool. The slide 12 is movable along intersecting vertical and horizontal axes whereby the tool support 10 can be moved universally in a vertical plane. Each tool support 10 has secured thereto a tool such as a boring bar 14 which is normally held in a retracted position, as shown in FIG. 3, and moved when needed to an operative position, as shown in FIG. 2. It is to be understood that the slide 12 may have mounted thereon a plurality of tool supports 10 adapted to be employed sequentially in a predetermined program of operations to accomplish separate machining operations on a workpiece.

Figure 6:
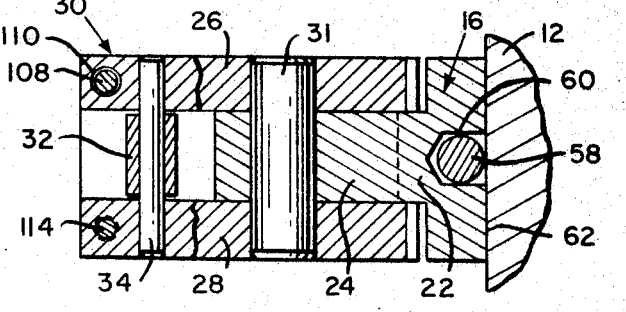
FIG. 6 is a sectional view taken substantially along the line 6—6 of FIG. 2.

The tool support 10 has a base plate 16 which is secured to the slide 12 by an upper pair of screws 18 which extend through the base plate and threadably engage the slide, and a lower pair of screws 20 which extend through a lower flange 21 of the slide and threadably engage the base plate. Base plate 16 is provided with a central rib 22 having precisely spaced, parallel side surfaces. A portion 24 of the rib 22 extends in close fitting relation between spaced flanges 26 and 28 of a tool holder 30. A pin 31 extending through flanges 26 and 28 and rib portion 24 pivotally connects the tool holder 30 to the base plate 16 (FIG. 6).

A link 32 positioned between the spaced flanges 26 and 28 of the tool holder 30 has one end pivotally connected to a pin 34 which extends between the flanges. The opposite end of the link 32 is pivotally connected by a pin 36 to the lower end of a piston rod 38. The upper end of the rod 38 is attached to a piston 40 adapted to reciprocate in a cylindrical bore 42 formed in a housing 44. The upper and lower ends of the bore 42 are sealed by upper and lower end caps 46 and 48, respectively, the rod 38 extending through the lower end cap. A conventional O-ring seal (not shown) is provided between the rod 38 and the end cap 48.

The housing 44 is fixedly mounted to the base plate 16 in a suitable manner and has formed therein a second cylindrical bore 50, the ends of which are sealed by upper and lower end caps 52 and 54, respectively. A piston 56, adapted to reciprocate within the cylindrical bore 50, is connected to a piston rod 58 which extends downwardly through the lower end cap 54. The downwardly extending portion of the rod 58 is positioned in a channel 60 formed in the base plate 16 so that no part of the rod would normally protrude beyond the rear surface 62 of the base plate.

A locking finger 64 attached to the lower end of the rod 58 has a vertically extending V-shaped surface 66, formed by angularly intersecting planes, in sliding engagement with a correspondingly formed surface 68 in the base plate 16 located adjacent the lower end of the channel 60. The locking finger 64 is also provided with a tapered V-shaped surface 70, formed by angularly intersecting planes, which extends upwardly and toward the slide 12.

The tool holder 30 has an integral extension 72 which is positioned beneath the locking finger 64 when the tool holder is in the vertical operative position (FIG. 2). An aperture 74 in the extension 72 has a surface 76 corresponding in shape and angular relation to the tapered surface 70 of the locking finger 64. The surface 76 is adapted to be slidingly engaged by the surface 70 when the locking finger 64 is moved downwardly into the aperture 74, whereby the locking finger forcibly urges the tool holder 30 toward the base plate (counterclockwise as viewed in FIG. 2) to positively position and lock the tool holder in the operative position. As the tool holder 30 is moved to the operative position, a lower portion 78 of the base plate rib 22 enters into close fitting engagement with a channel 80 formed in the tool holder to key the tool holder to the base plate and provide resistance against any lateral movement of the tool holder relative to the base plate during a machining operation.

Figure 5:
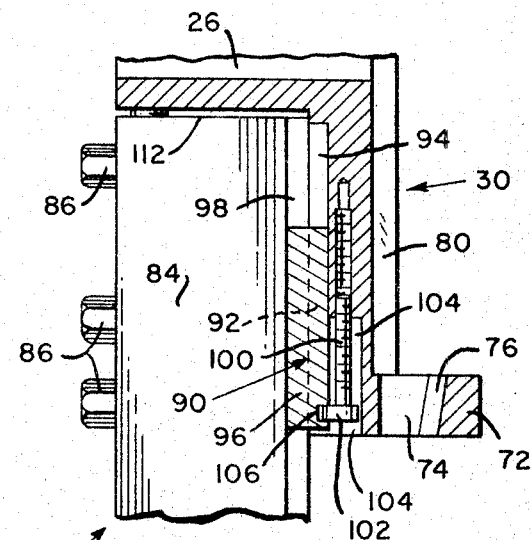
FIG. 5 is a sectional view taken substantially along the line 5—5 of FIG. 1.
Figure 4:
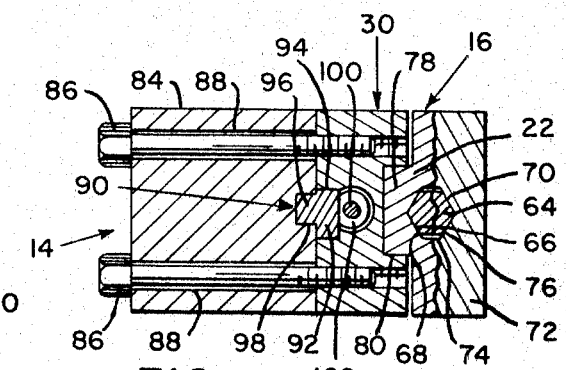
FIG. 4 is a sectional view taken substantially along the line 4—4 of FIG. 2.

The boring bar 14 has a cutting tip 82 and is preferably mounted on the tool holder 30 in a manner which permits vertical and horizontal adjustment of the position of the cutting tip relative to the tool holder when the tool holder is in the vertical operative position. (In the following description, it will be assumed for reference purposes that the tool holder is in the vertical operative position.) Referring to FIGS. 1, 4 and 5, such adjustments may be provided by securing a shank 84 of the boring bar 14 to the tool holder 30 by screws 86 which extend through holes 88 in the shank and threadably engage the tool holder. The holes 88 have a greater diameter than the bodies of the screws 86 to provide a clearance space around each screw. The boring bar 14 is thus capable of limited movement relative to the tool holder 30 when the screws 86 are loosened sufficiently to release the shank 84 from the normal tight frictional engagement with the tool holder.

To provide for lateral adjustment, a member 90 has a key portion 92 which slidingly engages a keyway 94 formed in the tool holder 30, and also a key portion 96 which slidingly engages a keyway 98 formed in the shank 84 of the boring bar 14. The key portion 92 and keyway 94 have a sliding axis which is angularly inclined relative to the vertical centerline of the tool support 10, whereas the key portion 96 and keyway 98 have a sliding axis which is parallel to the vertical axis of the tool support. An adjusting screw 100 has a shank which threadably engages the tool holder 30 and a head 102 which moves vertically in a recess 104 provided in the tool support as the adjusting screw is rotated. The screw head 102 extends into the keyway 94 and engages a slot 106 formed in the key portion 92. Rotation of the adjusting screw 100 thus causes the member 90 to be moved relative to the tool holder 30 and boring bar shank 84, and the key portion 96 to exert a lateral moving force on the keyway 98 to thereby laterally shift the boring bar 14 and cutter tip 82 relative to the tool holder.

Vertical adjustment of the boring bar 14 and cutting tip 82 relative to the tool holder 30 is provided by a cap screw 108 which extends through a hole 110 in the flange 26 to threadably engage an aligned tapped hole in the upper surface 112 of the boring bar, and a set screw 114 which extends through a tapped hole in the flange 28 to abut against the surface 112 of the boring bar. The hole 110 has a greater diameter than the body of the screw 108 so as to provide a clearance space which permits the shank 84 of the boring bar to be laterally adjusted as hereinbefore described. Screws 108 and 114 preferably have identical thread sizes so that displacement of both in the same direction and by the same amount will vertically move the cutter tip 82 relative to the tool holder 30.

The housing 44 has a passage 116 which communicates with the rod ends of both of the cylindrical bores 42 and 50 and is connected at all times by tubing 118 to a reservoir of hydraulic fluid maintained at a constant pressure. The housing 44 also has a passage 120 which communicates with the head ends of both of the cylindrical bores 42 and 50 and which is intermittently connected by tubing 122 through suitable valving (not shown) to a pressurized source of hydraulic fluid.

The diameters of the pistons 40 and 56 and their respective piston rods 38 and 58 are selected such that the ratio of the effective areas of the head end to the rod end is much greater for piston 40 than for piston 56. In the preferred embodiment of the invention shown, the diameter of the piston 40 is 1⅛ inches, that of piston 56 is 2 inches, and that of both piston rods 38 and 58 is ¾ of an inch. For piston 40, therefore, the effective areas of the head and rod ends are 0.994 and 0.552 square inch, respectively, with the ratios of the two being 1.80. Similarly, for piston 56 the effective areas of the head and rod ends are 3.142 and 2.700 square inches, respectively, with the ratio being 1.16.

The tubing 118 is connected to a reservoir of hydraulic fluid maintained at a constant pressure of 1800 p.s.i. so that constant upward forces of 994 pounds and 4,860 pounds are respectively exerted on pistons 40 and 56 at all times. Normally, the tubing 122 is connected through suitable valving to an exhaust reservoir at atmospheric pressure with the result that the tool holder 30 and locking finger 64 are normally held in the retracted position, as shown in FIG. 3, by reason of the forces constantly acting on the rod ends of the pistons 40 and 56.

When it is desired to move the boring bar 14 to the operative position, tubing 122 is connected by suitable valving to a source of pressurized hydraulic fluid, which may be the reservoir to which the tubing 118 is connected, or a separate source. In the preferred embodiment of the invention, the tubing 122 is connected at the appropriate time through an automatically operated valve to the same fluid reservoir maintained at 1800 p.s.i. as that to which the tubing 118 is constantly connected. Immediately upon the tubing 122 being connected to the 1800 p.s.i. fluid source, the fluid pressure in the head ends of both cylindrical bores 42 and 50 starts to rise from the normal atmospheric pressure condition. At some finite time interval $T_1$ following the connecting of tubing 122 to the pressurized fluid source, the pressure in the head ends of the cylindrical bores 42 and 50 reaches a value of 1000 p.s.i., whereupon the downward forces on the head ends of pistons 40 and 56 are 994 pounds and 3,142 pounds, respectively. Since the constant upward force on the rod end of piston 40 is also 994 pounds, the forces on the two sides of piston 40 are in balance and accordingly, with a slight increase in pressure, the resultant unbalanced force on piston 40 causes it to be reciprocated downwardly to move the tool holder 30 toward the operative position. At this time, however, the downward force on piston 56 of 3,142 pounds is still much less than the upward force thereon of 4,860 pounds, and piston 56 therefore remains stationary, thereby maintaining the locking finger 64 in the upward unlocked position.

As piston 40 reciprocates downwardly, the increasing volume in the cylindrical bore 42 presented to the inflowing hydraulic fluid prevents the pressure in the head ends of the cylindrical bores 42 and 50 from increasing appreciably above that needed to maintain the continued movement of the piston 40. When the piston 40 has reached the limit of its downward stroke and the tool holder 30 has accordingly been moved fully to the operative position, the pressure in the cylindrical bores 42 and 50 again starts to rise. At a time $T_2$, the pressure in the head ends of the cylindrical bores 42 and 50 reaches a value of 1547 p.s.i., whereupon the forces on the head and rod ends of piston 50 are in balance, both being equal to 4,860 pounds. A further slight increase in the pressure then causes the piston 56 to be reciprocated downwardly to move the locking finger 64 into the aperture 74, thereby locking the tool holder 30 in the operative position as shown in FIG. 2.

The time interval for accomplishing the movement of the tool holder 30 from the retracted to the operative positions and locking it in the operative position can be varied by appropriately positioning the control valve so as to vary the rate of flow of hydraulic fluid through the tubing 122 and passage 120 into the head ends of the cylindrical bores 42 and 50. However, the sequence of operation will always proceed in the manner described irrespective of the rate of flow of the pressurized fluid permitted by the control valve, and the locking finger 64 will in every case be maintained in the unlock position until the tool holder 30 has been fully moved to the operative position, and only then will the locking finger be moved into the aperture 74 by the piston 56.

Upon the completion of the machining operation by the boring bar 14, the tool holder 30 is moved to the normal retracted position by manipulation of the control valving to connect the tubing 122 to the exhaust reservoir maintained at atmospheric pressure. The constant upward forces of 4,860 pounds and 994 pounds acting on the rod ends of pistons 56 and 40, respectively, will first cause the locking finger 64 to be moved upwardly out of the aperture 74 to the unlock position, and immediately thereupon will cause the unlocked tool holder 30 to be automatically moved to the retracted position. The rate of movement of the tool holder 30 to the retracted position may be adjustably controlled by appropriately controlling the rate of the venting of the fluid in the head ends of the cylindrical bores 42 and 50 to the exhaust reservoir.

In modified forms of the invention, helical compression springs may be substituted for, or used to supplement, the constant fluid pressure acting upon the rod ends of the pistons 40 and 56 to urge the tool holder 30 and locking finger 64 to the retracted and unlock positions, respectively. In the modified constructions, the spring characteristics are selected so that the forces acting upon the rod ends of the pistons 40 and 56 throughout their entire strokes have predetermined values correlated to the effective areas of the head ends of the pistons. With properly selected springs, as the pressure of the hydraulic fluid flowing through the passage 120 to the head ends of the cylindrical bores 42 and 50 increases in magnitude, it reaches a value wherein the forces on the piston 40 are balanced and wherein with an additional pressure rise, the piston 40 is moved through its full stroke, during all of which a substantial net upward force is exerted on the piston 56. After the piston 40 has moved the tool holder 30 fully to the operative position, the pressure in the head ends of the cylindrical bores 42 and 50 continues to increase to a value wherein the forces on the piston 56 are balanced, with a slight additional increase in pressure then moving the locking finger 64 to the lock position in the proper sequence in the same manner as previously described with reference to the preferred embodiment of the invention.

With the tool supporting apparatus having the unique construction described, it is possible to normally maintain a tool holder in a retracted position and when its use is required, to automatically move the tool holder to an operative position and then lock it therein, all operations being rendered effective, if desired, by a single source of pressurized hydraulic fluid. Moreover, with the apparatus described, the movement of the various components is accomplished in a manner which eliminates the possibility of improper sequential operation. The rate of movement from the retracted to the operative positions, as well as from the operative position back to the retracted position, can be adjustably controlled by suitable valving which controls the rate of flow of the hydraulic fluid to and from the head ends of the cylindrical bores 42 and 50. These desirable operating characteristics are achieved with an apparatus having a relatively simple construction and consequently a relatively low cost of fabrication, but which at the same time has optimum reliability in operation and a structural rigidity which enables it to be used for machining operations having precise dimension and finish requirements.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. Retractable tool supporting apparatus for a machine tool, comprising a base member adapted to be secured to a machine tool; a tool support movably mounted on the base member for limited movement between retracted and operative positions; a locking member movably mounted on the base member for limited movement between unlock and lock positions; means on said tool support engageable by said locking member for locking said tool support in the operative position when said locking member is in the lock position; means for normally urging said tool support to the retracted position and said locking member to the unlock position; fluid-operated means for intermittently moving said tool support to the operative position and said locking member to the lock position when said fluid-operated means is connected to a source of pressurized fluid; and means for intermittently connecting said fluid-operated means to a source of pressurized fluid, said fluid-operated means including means rendered effective solely by the flow of said pressurized fluid to said fluid-operated means for initially moving said tool support from the retracted to the operative position while maintaining said locking member in the unlock position and thereafter moving said locking member to the lock position.

2. The apparatus set forth in claim 1 wherein said fluid-operated means includes first fluid-operated means connected to said tool support for moving the support between said retracted and operative positions and second fluid-operated means for moving said locking member between said unlock and lock positions, said first and second fluid-operated means respectively including first and second cylinders with first and second pistons disposed for reciprocating movement therein; and including means operatively acting upon one side of each of said first and second pistons for exerting first and second continuous forces respectively thereon urging the pistons to positions corresponding to the retracted position of the tool support and the unlock position of the locking member respectively; and means for introducing pressurized fluid from a common source simultaneously into said first and second cylinders adjacent the other sides of said pistons, said continuous forces exerted upon said one sides of, and the effective areas of the other sides of, said first and second pistons being correlated such that the first continuous force acting upon said one side of said first piston is exceeded by the force of said pressurized fluid acting upon the other side thereof and said tool support thereby is fully moved to the operative position before the force of said pressurized fluid acting upon said other side of said second piston exceeds said second continuous force acting upon said one side thereof.

3. The apparatus set forth in claim 2 wherein said means operatively acting upon said one sides of said first and second pistons comprises hydraulic fluid maintained at a constant pressure.

4. The apparatus set forth in claim 3 wherein the ratio of the effective areas of said other side to said one side of said first piston is greater than the ratio of the effective areas of said other side to said one side of said second piston.

5. The apparatus set forth in claim 2 wherein said means for connecting said fluid-operated means to a source of pressurized fluid includes valve means for controlling the rate of flow of said fluid into said cylinders adjacent the other sides of said pistons, whereby the rate of movement of said tool support from the retracted to the operative positions can be adjustably controlled.

6. The apparatus set forth in claim 2 wherein said tool support is pivotally mounted on said base member for limited oscillatory movement in an arcuate path between retracted and operative positions.

7. The apparatus set forth in claim 6 wherein said first fluid-operated means includes a piston rod attached to said first piston and extending from said first cylinder, and linkage means connecting the outwardly disposed end of said piston rod to said tool support for oscillating said tool support as said first piston is reciprocably moved in said first cylinder.

8. The apparatus set forth in claim 7 wherein said second fluid-operated means includes a piston rod attached to said second piston and extending from said second cylinder, and said locking member comprises a finger connected to the outwardly disposed end of said piston rod, said tool support having a latch opening disposed adjacent said finger when the support is in the operative position adapted to receive said finger therein when the finger is moved to the lock position, whereby said tool support is locked in the operative position.

9. The apparatus set forth in claim 8 wherein said piston rods are attached to said one sides of said first and second pistons and have the same diameter, and said second piston has a greater diameter than said first piston.

10. The apparatus set forth in claim 9 wherein said means operatively acting upon said one sides of said first and second pistons comprises hydraulic fluid maintained at a constant pressure.

11. The apparatus as set forth in claim 8 wherein said piston rods of said first and second fluid-operated means are disposed in parallel relation.

12. The apparatus set forth in claim 1 additionally including a tool mounted in said tool support and having a shank and a cutting tip, and means for adjusting the position of said tool relative to said support to adjust the position of the cutting tip relative to said tool support.

13. The apparatus set forth in claim 12 wherein said tool adjusting means includes a pair of integrally formed angularly disposed keys, keyways formed in each of said tool support and said tool shank, each keyway having one of said keys slidingly disposed therein, and screw adjusting means for varying the position of said keys relative to said tool shank and said tool support to thereby vary the position of said tool shank relative to said tool support.

14. The apparatus set forth in claim 13 wherein said keyway formed in said tool shank and the key disposed therein have a sliding axis parallel to the vertical centerline of said apparatus, whereby movement of said keys relative to said tool shank and said tool support results in a lateral movement of said tool shank relative to said tool support.

No references cited.

WILLIAM W. DYER, Jr., *Primary Examiner.*

G. A. DOST, *Assistant Examiner.*